US006348265B1

(12) United States Patent
Jansson et al.

(10) Patent No.: US 6,348,265 B1
(45) **Date of Patent: *Feb. 19, 2002**

(54) PHOSPHATE COATED IRON POWDER AND METHOD FOR THE MANUFACTURING THEREOF

(75) Inventors: Patricia Jansson, Viken; Lars-Åke Larsson, Höganäs, both of (SE)

(73) Assignee: Höganäs AB, Hoganas (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,311

(22) Filed: Aug. 21, 1998

Related U.S. Application Data

(63) Continuation of application No. PCT/SE97/00283, filed on Feb. 19, 1997.

(30) Foreign Application Priority Data

Feb. 23, 1996 (SE) .............................................. 9600724
Feb. 23, 1996 (SE) .............................................. 9600725

(51) Int. Cl.[7] ......................... B32B 15/04; B32B 15/18; H01F 1/06; H01F 1/24
(52) U.S. Cl. ....................................... 428/403; 148/306
(58) Field of Search ........................... 428/403; 148/306

(56) References Cited

U.S. PATENT DOCUMENTS 2,232,352 A * 2/1941 Verweij et al. ............. 427/127
4,177,089 A * 12/1979 Bankson ..................... 148/309

FOREIGN PATENT DOCUMENTS

| | | |
|---|---|---|
| DE | 1291028 | 3/1969 |
| DE | 2825235 | 1/1985 |
| DE | 3439397 C2 | 1/1990 |
| EP | 0434669 A2 | 6/1991 |
| WO | WO95/29490 | 11/1995 |

* cited by examiner

*Primary Examiner*—Paul Thibodeau
*Assistant Examiner*—Ramsey Zacharia
(74) *Attorney, Agent, or Firm*—Burns, Doane, Swecker & Mathis, L.L.P.

(57) ABSTRACT

The invention concerns a novel low oxygen powder comprising particles of a base powder consisting of essentially pure iron having an insulating oxygen- and phosphorus-containing barrier. The oxygen content of the new powder is at most 0.2% by weight higher than the oxygen content of the base powder, and the ratio O:P is between 30 and 1, preferably between 15 and 2 and most preferably between 10 and 3 as measured by the ESCA method. The invention also concerns a new method of preparing an iron-based powder comprising the steps of preparing a base powder consisting of a water atomized iron powder or a sponge iron powder, subjecting the mixture to treatment with a solution of phosphoric acid in an organic solvent and drying the obtained mixture, whereby the solution of phosphoric acid is sprayed on the base powder while being mixed.

11 Claims, 1 Drawing Sheet

PHOSPHATE COATED IRON POWDER AND METHOD FOR THE MANUFACTURING THEREOF

Figure 1:
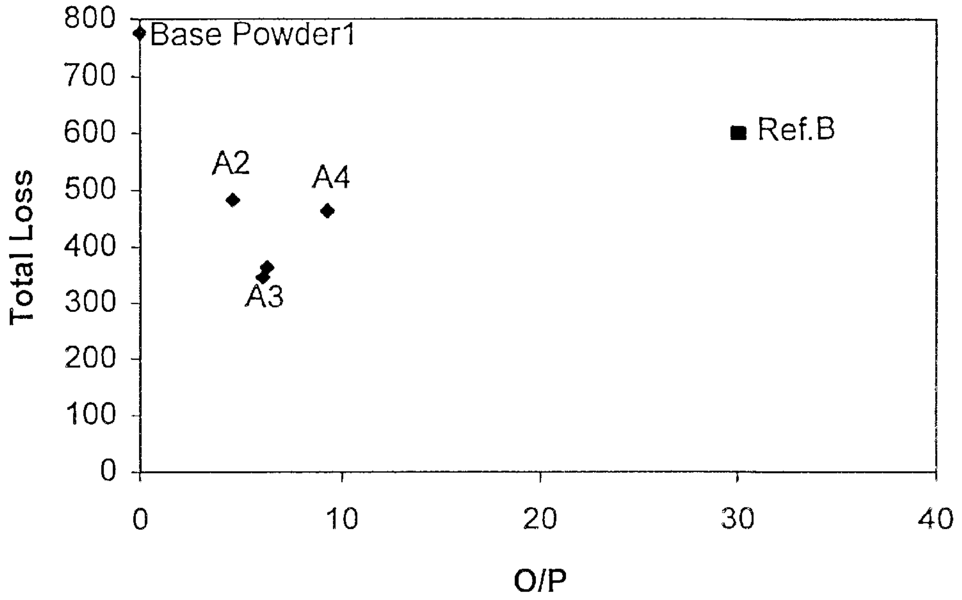

This is a continuation of International Application No. PCT/SE97/00283, filed Feb. 19, 1997, that designates the United States of America.

The present invention concerns a new iron-based powder. More specifically, the invention concerns a new iron-based powder which is useful for the preparation of soft magnetic materials having improved properties when used both at high and low frequencies. The invention also concerns a new method for the manufacturing of the new iron-based powder.

Iron-based particles have long been used as a base material in the manufacture of structural components by powder-metallurgical methods. The iron-based particles are first moulded in a die under high pressures in order to produce the desired shape. After the moulding step, the structural component usually undergoes a sintering step to impart the necessary strength to the component.

Magnetic core components have also been manufactured by such power-metallurgical methods, but the iron-based particles used in these methods are generally coated with a circumferential layer of insulating material.

Two key characteristics of an iron core component are its magnetic permeability and core loss characteristics. The magnetic permeability of a material is an indication of its ability to become magnetised or its ability to carry a magnetic flux. Permeability is defined as the ratio of the induced magnetic flux to the magnetising force or field intensity. When a magnetic material is exposed to a rapidly varying field, the total energy of the core is reduced by the occurrence of hysteresis losses and/or eddy current losses. The hysteresis loss is brought about by the necessary expenditure of energy to overcome the retained magnetic forces within the iron core component. The eddy current loss is brought about by the production of electric currents in the iron core component due to the changing flux caused by alternating current (AC) conditions.

Magnetic core components are often made from laminated sheet steel, but these components are difficult to manufacture to net shape for small intricate parts and experience large core losses at higher frequencies. Application of these lamination-based cores is also limited by the necessity to carry magnetic flux only in the plane of the sheet in order to avoid excessive eddy current losses. Sintered metal powders have been used to replace the laminated steel as the material for the magnetic core component, but these sintered parts also have high core losses and are restricted primarily to direct current (DC) operations.

Research in the powder-metallurgical manufacture of magnetic core components using coated iron-based powders has been directed to the development of iron powder compositions that enhance certain physical and magnetic properties without detrimentally affecting other properties. Desired properties include a high permeability through an extended frequency range, high pressed strength, low core losses and suitability for compression moulding techniques.

When moulding a core component for AC power applications, it is generally required that the iron particles have an electrically insulating coating to decrease core losses.

Different types of insulating coatings which are used for particles of iron are disclosed in the literature.

According to DE 1 291 028 the iron powder is treated with a solution of phosphoric acid and it is subsequently washed and dried. This process is characterised in that the iron powder has a particle size of at most 10 μm and that the powder is treated with chromic acid in addition to the phosphoric acid. The publication does not disclose the magnetic properties for materials prepared by using the iron powder.

Another publication within this field is DE 2 825 235, which discloses an iron powder consisting of particles which are coated with an oxide layer. The particle size is between 0.05 and 0.15 mm and the particles have an oxide coating which, calculated on the particle weight, includes 0.3 to 0.8% by weight of oxygen. The oxide coating can be obtained by heating in air or by chemical oxidation, but no process parameters and no analysis of the coated particles are disclosed. From the examples it can be calculated that the permeabilities obtained are in the range of 30 to 35.

European patent application 434 669 concerns a magnetic powder, wherein an electrically insulating coating separates the magnetic powder particles. The particles have an average particle size of 10–300 μm, and the insulating material which covers each of the particles of the magnetic powder comprises a continuous insulating film having a thickness of 10 μm or less, and this film comprises a metal alkoxide or a decomposition product thereof.

WO 95/29490 discloses insulating layers which are obtained by using a method based on phosphoric acid in water.

Finally, DE patent 3 439 397 discloses iron particles which are electrically insulated by a phosphate coating. This coating could be for example magnesium or zinc phosphate. The insulating phosphate coating should be between 0.1 and 1.5% of the weight of the iron particles. Example 1 of this publication discloses in more detail that this electrically insulating coating is obtained by stirring the iron powder in a solution of 89% of phosphoric acid in acetone. A comparative study between the powder according to the WO-patent application and the powder according to the DE patent has revealed that the insulating layer according to the DE Patent includes considerably more oxygen and phosphorus than the powder according to the WO application.

It has now quite unexpectedly been found that remarkably improved properties can be obtained by using the new low oxygen powder according to the present invention. These properties include strength, density, induction and permeability in combination with lower loss.

The new powder is based on a base powder which essentially consists of pure iron and could be e.g. a commercially available water-atomised iron powder or a sponge iron powder with round, irregular or flat particles. Typical examples of irregular, water-atomised powders which can be used are the powders of the ABC 100 and ASC 100 series available from Höganäs AB, Sweden. The particle size of the base powder depends on the intended final use of the powder and is generally less than 200 μm and preferably less than 150 μm. For higher frequencies, particles sizes below 45 μm are preferred. It is furthermore preferred that the majority of the particles of the iron base powder should have a particle size above 10 μm.

According to the invention this base powder is provided with an oxygen coating or barrier, and it is a distinctive new feature that the amount of oxygen of the new powder is only slightly elevated as compared with that of the base powder. More specifically the amount of oxygen in the new powder is at most 0.2%, preferably at most 0.15% by weight higher than in the base powder.

It is believed that the surface structure and composition of the particles is important for the properties of the new powder, and for this reason the new powder has been studied by the ESCA method (cf. "Proceedings of the sixth international conference on X-ray optics and microanalysis", University of Tokyo Press, 1972, pp 385–392 and 393–398 or "Solid state chemistry and its applications" by Anthony R. West, Published by John Wilew and Sons, 1984, p 86 and pp 92–96). According to this method the ratio O:P should be less than 30 and more than 1. Preferably this ratio should be less than 15 and more than 2, and most preferably less than 10 and more than 3.

Another important feature of the surface barrier of the particles of the new powder is the thickness and by using the AES method (cf. The publication "Solid state chemistry and its applications" referred to above) it has been found that the insulating barrier or coating should be less than 100 nm, preferably less than 70 nm, and most preferably less than 50 nm.

The insulating coating according to the present invention is applied on the base powder by treating the base powder with phosphoric acid in an organic solvent for a period sufficient to obtain the indicated amounts. The concentration of the phosphoric acid in the organic solvent should be considerably lower than the concentration disclosed in the DE patent and vary between 0.5 and 50%, preferably between 0.5 and 20%, and most preferably between 1 and 5%. The new powder can be obtained by spraying the phosphoric acid solution on the base powder for a period sufficient to obtain the levels indicated above. The concentration of the phosphoric acid should preferably be less than 10 and most preferably less than 5% by weight.

The new iron-based powder according to the invention can be combined with a lubricant in an amount of 0.1 to 1.0% by weight and optionally an organic thermosetting or thermoplastic resin before the compacting step. Representative examples of lubricants are Kenolube®,H wax, EBS and stearates, such as zinc stearate. The organic resin could be selected from the group consisting of Peracit, Ultem.

The compacting could be carried out at conventional pressures up to 1000 Mpa and the compacting could be carried out both at ambient and elevated temperature.

The invention is further illustrated by the following experiments.

Samples of 1 kg of the powder ABC100.30, which is commercially available from Höganäs AB, Sweden, were subjected to a coating process by the use of orthophosphoric acid in water and ethanol, respectively. The solutions were sprayed on the iron-based powder in amounts varying from 2.5 to 120 ml/kg for a period of time sufficient to obtain a coating or barrier of oxygen and phosphorus. All the samples were subsequently dried in order to remove the solvent. ESCA analysis of the obtained powders revealed that the 0:P ratio (Atom% O:Atom% P)of the powder obtained by using the aqueous solution was about 30 and that the same ratios obtained by using the process according to the present invention varied between 5 and 10.

A chemical analysis of the samples disclosed that the oxygen content of the powder obtained by using the aqueous solution was above 0.2% higher than in the base powder, whereas the oxygen content of the powder obtained by using the process according to the invention had an oxygen content less that 0.2% higher that that of the base powder. An AES analysis of the samples showed an oxide thickness below 100 nm for all the samples.

The following table summarises data obtained with the new powder, referred to as A, in comparison with powders outside the scope of the invention.

TABLE 1

| Sample | O/P | Atom % P | Atom % 0 | 0tot | 0 added | $P_{tot}$ | $P_{added}$ |
|---|---|---|---|---|---|---|---|
| Base Powder (1) | | 0.00 | 53.98 | 0.067 | 0 | 0.003 | 0 |
| A4 | 9.3 | 5.83 | 53.98 | 0.070 | 0.003 | 0.004 | 0.001 |
| A3 | 6.95 | 5.91 | 41.13 | 0.093 | 0.026 | 0.014 | 0.011 |
| A2 | 4.6 | 13.49 | 61.92 | 0.171 | 0.104 | 0.048 | 0.045 |
| Ref. B | 29.7 | 1.92 | 57.01 | 0.214 | 0.147 | 0.013 | 0.010 |

The O/P ratios we re measured by ESCA using a KPATOS AXIS HS spectrometer with monochromatic Al as X-ray source $K_{\alpha}$=1486.6 eV; ~395 nm.

The amount of O and P was measured by chemical analysis.

Ref B was a sample prepared from an aqueous solution, in accordance with the method disclosed in WO 95/29490.

Table 2 discloses the green strength and the density obtained for materials prepared from the new powder in comparison with powders outside the scope of the invention. The powders were compacted at 800 MPa and 0.6% Kenolube was added as lubricant.

TABLE 2

| Material | Green Strength (N/mm$^2$) | Density (g/cm$^3$) |
|---|---|---|
| Ref B | 26.71 | 7.25 |
| A | 39.55 | 7.31 |
| Ref C | 19.24 | 7.14 |

Ref. C concerns a sample prepared according to the DE patent 3 439 397.

The improved effect of the low oxygen powders according to the present invention on the magnetic properties of samples prepared of the low oxygen powders is illustrated by FIG. 1. The powders have been defined by their O/P ratios measured by the ESCA method. The samples were prepared by compacting the powders at 800 MPa and heating the compacted sample for a period of 30 min at 500° C. "Ref B" indicates the results obtained by using the aqueous process for the same iron-base powder. As can be seen, a dramatic improvement can be obtained with the new low oxygen iron powder according to the present invention.

Figure 2:
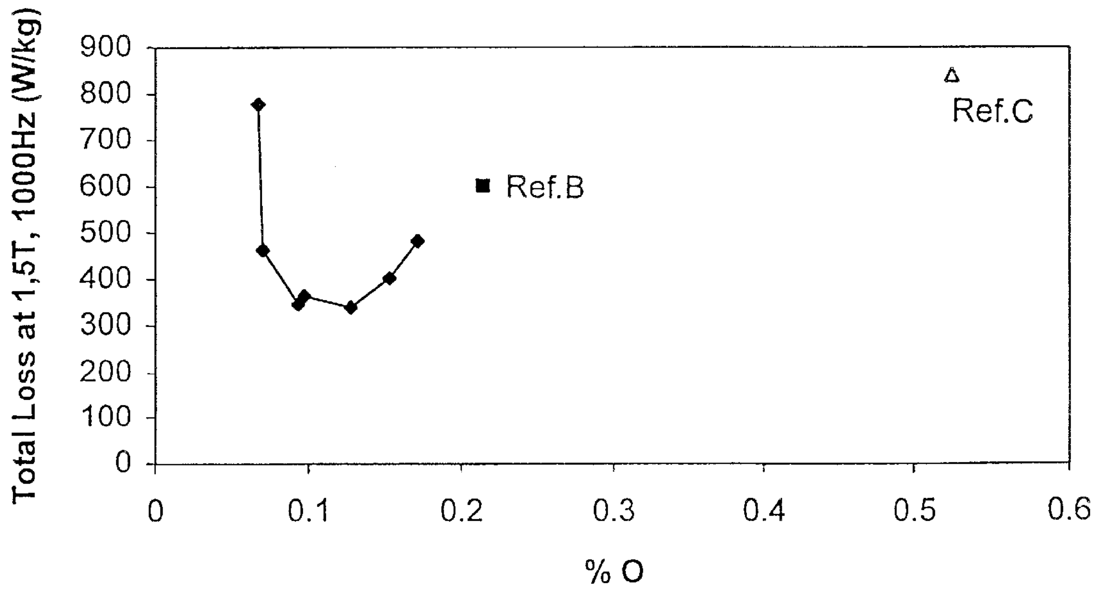

FIG. 2 discloses the improved effect as a function of the total oxygen content of the samples disclosed in FIG. 1.

What is claimed is:

1. A low oxygen powder comprising particles of a base powder consisting essentially of pure iron having an insulating oxygen- and phosphorus-containing barrier, the oxygen content of the powder being at most 0.2% by weight higher than the oxygen content of the base powder, the ratio O:P being between 15 and 2 as measured by the ESCA method and the barrier having a thickness of at most 100 nm as measured by the AES method.

2. A low oxygen powder according to claim 1, wherein the base powder is a sponge iron powder or a water-atomized iron powder.

3. A low oxygen powder according to claim 2, wherein said barrier has a thickness less than 50 nm.

4. A low oxygen powder according to claim 2, wherein said barrier has a thickness less than 50 nm.

5. A low oxygen powder according to claim 1, wherein the ratio O:P is between 10 and 3.

6. A low oxygen powder according to claim 1, wherein said barrier has a thickness less than 70 nm.

7. A low oxygen powder according to claim 1, wherein said barrier has a thickness less than 50 nm.

8. A low oxygen powder according to claim 1, wherein the particles have a size of less than 200 μm and a majority of the particles have a size above 10 μm.

9. A low oxygen powder comprising particles of a base powder consisting essentially of pure iron having an insulating oxygen- and phosphorus-containing barrier, the oxygen content of the powder being at most 0.2% by weight higher than the oxygen content of the base powder, the ratio O:P being between 15 and 2 as measured by the ESCA method and the barrier having a thickness of at most 100 nm as measured by the AES method, the powder being a water-atomized or sponge iron powder, and a majority of the particles having a particle size above 10 μm.

10. A low oxygen powder comprising particles of a base powder consisting essentially of pure iron having an insulating oxygen- and phosphorus-containing barrier, the oxygen content of the powder being at most 0.2% by weight higher than the oxygen content of the base powder, the ratio O:P being between 15 and 2 as measured by the ESCA method, the barrier having a thickness of at most 100 nm as measured by the AES method, and the barrier consisting essentially of oxygen and phosphorus, the powder being prepared by spraying a phosphoric acid solution on the powder particles.

11. The low oxygen powder according to claim 10, wherein the phosphoric acid solution comprises phosphoric acid in an organic solvent.

* * * * *